United States Patent
Zhu

(10) Patent No.: US 7,133,679 B2
(45) Date of Patent: Nov. 7, 2006

(54) RADIO NETWORK PLANNING

(75) Inventor: Houtao Zhu, Yokohama (JP)

(73) Assignee: Nokia Corporation, Espoo (FI)

( * ) Notice: Subject to any disclaimer, the term of this patent is extended or adjusted under 35 U.S.C. 154(b) by 392 days.

(21) Appl. No.: 10/694,570

(22) Filed: Oct. 27, 2003

(65) Prior Publication Data

US 2005/0090217 A1    Apr. 28, 2005

(51) Int. Cl.
  *H04B 1/60* (2006.01)
  *H04Q 7/20* (2006.01)
(52) U.S. Cl. ............... 455/446; 455/422.1; 455/10
(58) Field of Classification Search .......... 455/101, 455/133, 504, 132–135, 10, 446, 422.1, 423, 455/238.1, 456.1; 370/204, 320, 335, 342
See application file for complete search history.

(56) References Cited

U.S. PATENT DOCUMENTS

| | | | | |
|---|---|---|---|---|
| 5,507,035 A | * | 4/1996 | Bantz et al. | 455/133 |
| 5,546,443 A | * | 8/1996 | Raith | 455/450 |
| 5,574,466 A | * | 11/1996 | Reed et al. | 342/359 |
| 6,389,294 B1 | | 5/2002 | Sipila | 455/506 |
| 6,477,376 B1 | | 11/2002 | Carter | 455/446 |
| 6,823,175 B1 | * | 11/2004 | Zayana et al. | 455/67.11 |
| 6,996,375 B1 | * | 2/2006 | Dent et al. | 455/67.16 |
| 6,996,380 B1 | * | 2/2006 | Dent | 455/101 |
| 2004/0058681 A1 | * | 3/2004 | Schreuder et al. | 455/442 |

FOREIGN PATENT DOCUMENTS

| | | |
|---|---|---|
| WO | WO 00/27149 | 11/2000 |
| WO | WO 02/35872 | 2/2002 |

* cited by examiner

*Primary Examiner*—Sonny Trinh
(74) *Attorney, Agent, or Firm*—Perman & Green, LLP

(57) ABSTRACT

A method of estimating the operating characteristics of a communication unit in a radio network in which a plurality of such communication units can communicate with a plurality of terminals by means of wireless signals and in which the terminals and the communication units are capable of macro-diversity communication whereby a terminal may simultaneously communicate with a plurality of the communication units, the method comprising: estimating for the communication unit and neighboring communication units the propagation characteristics of signals to and/or from each such communication unit, in a manner specific to that respective communication unit; determining based on at least the estimated propagation characteristics and the relative locations of the communication unit and the neighboring communication units a representation of at least one of the macro-diversity gain for the communication unit and the fading margin for the communication unit.

13 Claims, 2 Drawing Sheets

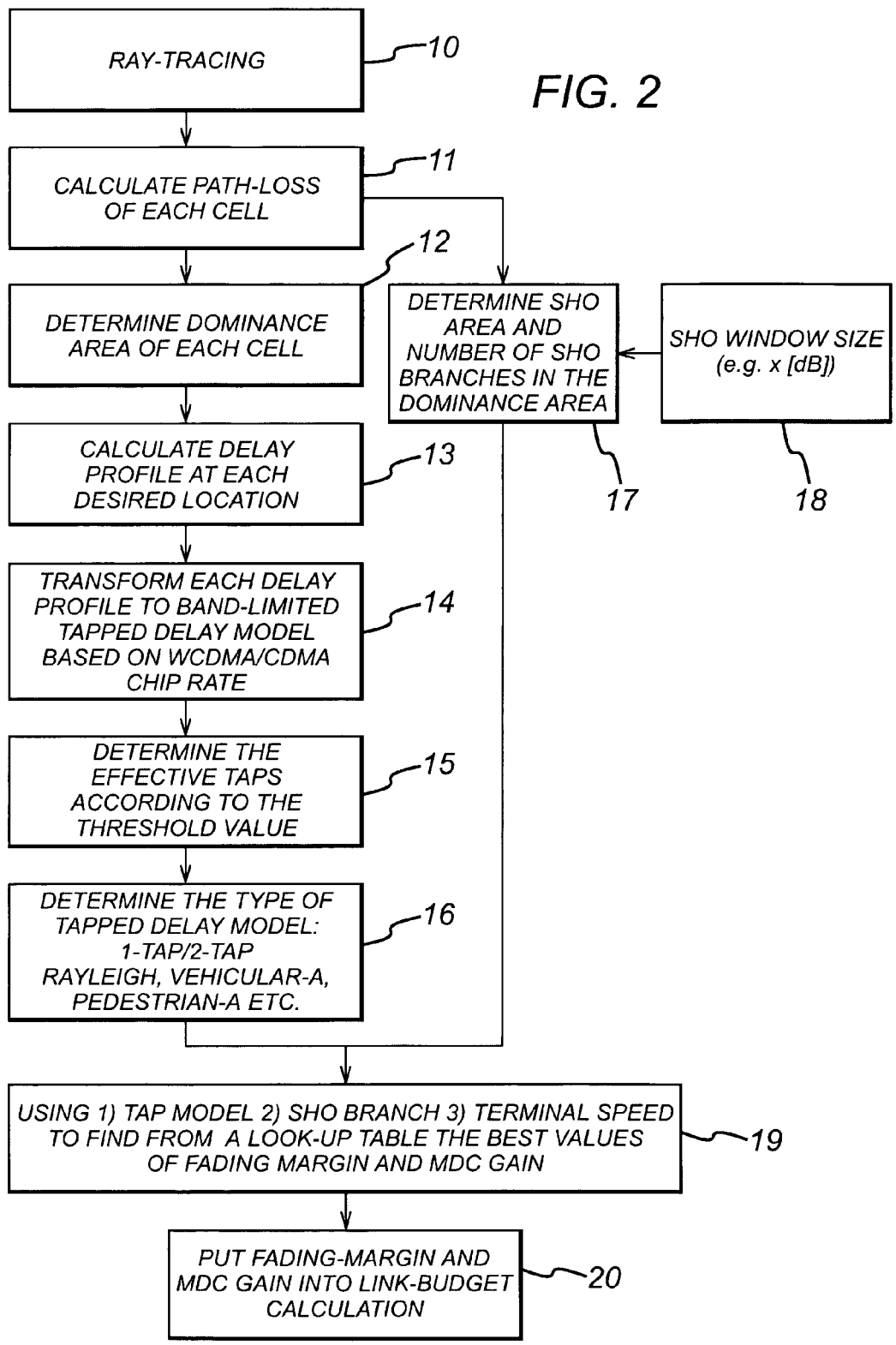

RADIO NETWORK PLANNING

FIELD OF THE INVENTION

This invention relates to deployment of radio networks, and most preferably planning the locations of radio base stations in a radio network such as a cellular telephone network.

BACKGROUND OF THE INVENTION

FIG. 1 shows schematically the architecture of a cellular telephone network. The network comprises a number of base stations 1, each of which is capable of bidirectional radio communication with mobile stations 2 that are within its range. Each base station is connected to a core network function 3, which controls the handling and routing of calls to and from the mobile stations 2, and between terminals in the network and terminals in other networks 4, to which it is connected.

The range of operation of a base station forms a cell 5. The geographical size of the cell is dependent on a number of factors. The cell cannot extend beyond the range within which the base station can successfully communicate with the mobile station. This is dependent on the landscape of the region around the base station, and thus the objects there that may disrupt radio signals, on the sensitivity of reception of the mobile stations and the base station and on the maximum transmit and receive power available to the mobile stations and the base station.

Some cellular telephone networks can use macrodiversity. In macrodiversity a mobile station can communicate traffic data with two or more base stations simultaneously ("soft hand-off"). This can provide a number of advantages, including reducing the risk of signal degradation due to interference and facilitating the hand over of the mobile station from one cell to another.

Radio network planning is a complicated process that mainly consists of network dimensioning, detailed capacity and coverage planning, and network optimisation.

When a cellular telephone network is to be deployed the network planners must decide on the locations where the base stations are to be installed, and the configuration of those base stations. In doing so they will wish to minimise the number of base stations that are required, so as to keep costs low, whilst ensuring that the network can provide a desired level of service. These decisions are complex. For example, as the cell size is increased the number of base stations that are required is reduced, but the battery life of the mobile stations will shorten (since they will need to use greater transmit power) and the level of interference will increase, especially in CDMA (code division multiple access) systems where more than one nearby base station or mobile station may transmit on the same frequency simultaneously. One example of such as system is the 3G (third generation)/WCDMA (wideband CDMA) system which is currently being implemented. The complexity increases in systems that implement macrodiversity since the power required is also dependent on the incidence of soft hand-off. In spite of these difficulties, the cost of network equipment makes it is highly desirable to optimise the planning as much as possible.

The planning decision is based on an assessment of the power required by each base station. This is dependent on a number of factors, notably:

1. the requirements of any standards with which the network must comply;
2. attenuation and other forms of signal degradation due to the landscape around the base station; and
3. for base stations operating in systems that allow macrodiversity, the degree to which the operations of nearby base stations are likely to affect the required power.

Factor 1 is well-defined. However, factors 2 and 3 are extremely difficult to determine in practice. With sufficiently detailed modelling it might be possible to make an accurate estimate of factors 2 and 3 on a small scale using prior art techniques, but in practice such modelling would require far too much calculation and measurement to be useful for planning a network. Therefore, network planning must be based on an approximation of the effects of factors 2 and 3. That estimate is often taken as being common to all base stations in a system, or to all base stations in a certain environment (e.g. urban or suburban). Yet factors such as MDC gain and fast-fading margin differ in practice from cell to cell. As a result each sector/cell may not be optimally planned with a proper set of parameters, which in return degrades the capacity/coverage in the network.

In practice, network planning is conventionally performed by choosing network parameter values that are either statistically obtained from measurements or verified by link-level simulations. For example, it is common to use MDC (macrodiversity combining) gain and fast-fading margin derived from link-level simulations for the link budget calculation in CDMA networks (see Jaana Laiho, Achim Wacker, Tomas Novosad, "Radio Network Planning and Optimisation for UMTS", John Wiley & Sons, Ltd.). The values of MDC gain and fast-fading margin used in network planning are typically taken to be the same for each cell/sector. In other words, those parameter values are not site-specific or location-dependent.

WO 02/35872 discloses a method for planning a CDMA network. Domains of base stations are calculated using geographical information. Then the service areas of the base stations are determined, taking macrodiversity into account on a block-by-block (pixel-by-pixel) basis. Neither macrodiversity gain nor fading margin is calculated, or identified as a tool for network planning.

U.S. Pat. No. 6,389,294 discloses a method of determining the effect of radio wave multipath fading in different sub-areas of a desired area in a radio system.

U.S. Pat. No. 6,477,376 discloses a method of optimising the designing of cell sites for mobile communications systems using uplink parameters. The method selects a propagation model to be used in calculating the predicted signal loss.

As outlined above, any improvement in the accuracy of the data that is available for network planning, and that can be obtained with a reasonable level of computation, would be highly valuable. It could increase the utilisation of radio resources in the network, and reduce the need for adjustments to optimise the network after deployment.

SUMMARY OF THE INVENTION

According to the present invention there is provided a method of estimating the operating characteristics of a communication unit in a radio network in which a plurality of such communication units can communicate with a plurality of terminals by means of wireless signals and in which the terminals and the communication units are capable of macro-diversity communication whereby a terminal may simultaneously communicate with a plurality of the communication units, the method comprising: estimating for the communication unit and neighbouring communication units the propagation characteristics of signals to and/or from each such communication unit, in a manner specific to that respective communication unit; determining based on at least the estimated propagation characteristics and the relative locations of the communication unit and the neighbouring communication units a representation of at least one of the macro-diversity gain for the communication unit and the fading margin for the communication unit, wherein the step of determining a representation of at least one of the effective macro-diversity gain for the communication unit and the fading margin for the communication unit comprises: estimating a dominance area for the communication unit; modelling the delay of signals in the dominance area by means of a delay model; estimating the extent of macrodiversity in the dominance area; determining the said representation based on the said delay model, the estimated extent of macrodiversity and an estimated speed of a terminal relative to the communication units.

The step of estimating the propagation characteristics is preferably performed by means of ray tracing.

Preferably The step of determining a representation of at least one of the effective macro-diversity gain for the communication unit and the fading margin for the communication unit comprises: estimating a dominance area for the communication unit; modelling the delay of signals in the dominance area by means of a delay model; estimating the extent of macrodiversity in the dominance area; determining the said representation based on the said delay model, the estimated extent of macrodiversity and an estimated speed of a terminal relative to the communication units.

The dominance area is suitably the area in which it is estimated that the communication unit would provide a stronger signal than the other communication units.

Preferably the delay model is determined by: estimating a delay profile for communications from the communication unit to a plurality of locations in the dominance area; and selecting the delay model from a plurality of predetermined delay models as being the one of those delay models that best represents the delay profiles to the said locations.

The wireless signals suitably have a chip rate. The step of estimating the delay profile preferably comprises: determining for each of the said locations a tapped delay model representative of the respective delay profile and the chip rate; and the step of selecting the delay model comprises selecting from the predetermined delay models the one of those delay models that best represents the determined tapped delay models. The delay models may include one or more n-tap delay models, wherein n is an integer greater than 0, and/or a Rayleigh fading model.

The step of estimating the extent of macrodiversity in the dominance area preferably comprises determining the average number of macrodiversity branches for terminals operating in the dominance area.

The method preferably comprises determining based on the macro-diversity gain for the communication unit and/or the fading margin for the communication unit a configuration for the network, and operating the network according to that configuration.

Suitably the said configuration includes one or more of a location for one the communication unit and an operational parameter of the communication unit. The operational parameter is preferably a transmission power parameter, for example a maximum transmit power setting parameter.

The radio network is preferably operable according to a CDMA method. Preferably some or all of the signals are CDMA signals.

Preferably the terminals are radio telephones.

The present invention will now be described by way of example with reference to the accompanying drawings.

BRIEF DESCRIPTION OF THE DRAWINGS

In the drawings:

FIG. 2 illustrates a process for estimation of base station performance data.

DETAILED DESCRIPTION OF THE PREFERRED EMBODIMENTS

Figure 1:
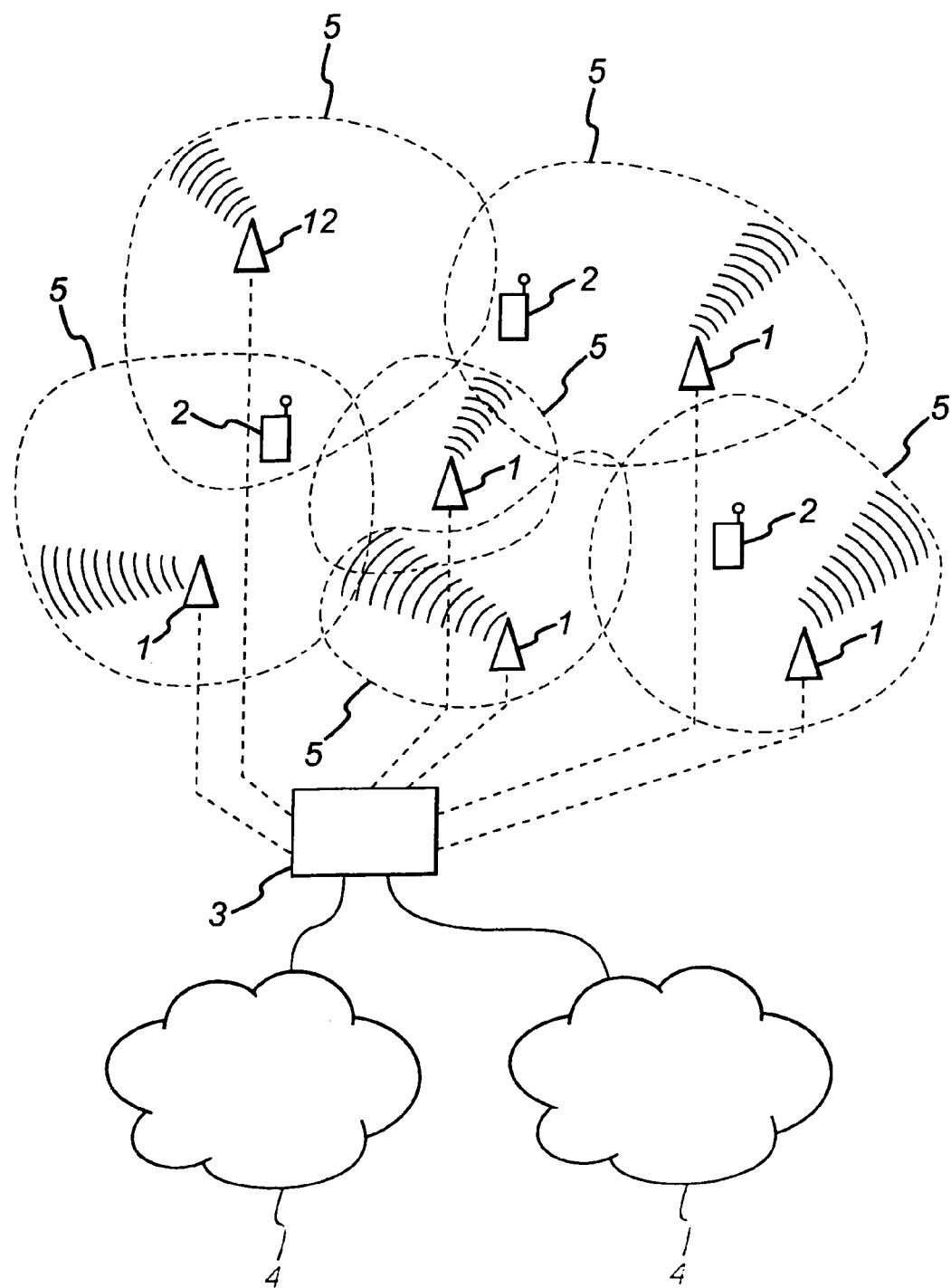
FIG. 1 is a schematic diagram of the architecture of a cellular telephone network.

In a preferred embodiment of the present invention the propagation characteristics that are expected to apply for signals between mobile stations and the base stations in all or a part of a network are estimated in a manner specific to each base station. That manner may, for example, take account of landscape factors such as relief, buildings and trees which can affect signal propagation. The estimation may be performed for the uplink or downlink or preferably for both. Using this information the effect of macrodiversity on the required power can be estimated. In the preferred embodiment at least one of the macrodiversity gain and the fading margin for one or more of the base stations is calculated.

In a preferred embodiment, ray tracing or an equivalent process is used to model signal propagation characteristics and thereby estimate path-loss and delay profile. The ray tracing is performed in a manner that is site-specific and location dependent. Thus a separate ray tracing (or equivalent) step is performed for each base station, and the ray tracing (or equivalent) for each base station takes as input at least one parameter that is representative of a certain characteristic of the respective base station, and at least one parameter that is representative of a certain characteristic of the location (by which is also included proposed location) of the respective base station. The values of these parameters differ from base-station to base-station.

Then the dominance area of each cell is obtained from the estimated path-loss. This may be done in the same manner as with current network planning tools. By knowing the SHO (soft hand-off) window size (as an input), SHO areas and the number of SHO branches that terminals can have at each location can be predicted as well.

The estimated delay profile is transformed to band-limited-tapped delay model in terms of CDMA/WCDMA chip rate. Effective taps can be determined according to the threshold values. With knowing the number of effective-taps, the type of tapped delay model can be determined. The dominant type of tapped delay model in one dominance area can be determined by observing a histogram distribution. The average number of SHO branches in one dominance area can be calculated as well. Finally, by applying the known type of tapped delay model, the average number of SHO branches in each cell/section and the expected terminal speed (as an input), the values of fading margin and MDC gain can be determined, for example from a look-up table. These cell/sector-specific parameter values can be used in the calculation of link budget for each cell/sector.

One detailed implementation of obtaining site-specific MDC gain and fast-fading margin is illustrated in FIG. 2. The steps are described below.

First, the ray tracing step (step 10) is performed for each base station in the geographical region under analysis. This step can be done using commonly available ray-tracing tools and network-planning tools such as NPSW or NetAct Planner (available from Nokia Corporation). One example of a ray tracing method is disclosed in WO 00/27149, the contents of which are incorporated herein by reference. The ray tracing analysis is performed individually for each base station, so as to take into account factors of the landscape around each base station that will be expected to have an effect on signal propagation. Those factors could include relief (e.g. hills and valleys), structures (e.g. buildings and trees) and sources of interference.

The ray tracing step can provide the predicted path loss of each cell (step 11), and from that the dominance area of each cell: i.e. the zone of the locations at which communications with the base station of that cell are stronger than with the base stations of any other cells (step 12).

The ray tracing step can also provide a delay profile for each location under consideration. (Step 13). Preferably a set of locations that are expected to be representative are considered. The set of locations may be assigned by selecting locations as random, by selecting equally-spaced locations on a grid pattern, or by a more sophisticated method that takes account of expected user density within the coverage area.

Then a tapped delay model for at each such location, based on the chip rate of the system under consideration can, be determined (step 14). Ray tracing can predict the delay profile at each receiving station. The predicted delay profile is formed of rays at each predicted delay instant. These received rays, with amplitude and phases, are effectively band-unlimited. They can be transformed with band-limited filters and sampled with the chip rate of the communication system in question (e.g. WCDMA/CDMA) to arrive at the tapped delay model. Each sample along the delay axis is termed a tap. Then the effective taps are selected if their amplitudes are not less than a threshold value. (Step 15). This threshold value is defined by:

Threshold=max. tap amplitude (in dB scaled) -dynamic range of receiver

The dominant tapped delay model in the dominance area is then determined. (Step 16). This may, for example be an n-tap model, where n is an integer (e.g. 1, 2, 3, 4 or 5), a Rayleigh fading model, .a vehicular-A fading model, a pedestrian-A fading model or any other form of fading model. Preferably a set of fading models is established initially, and the dominant model is selected from among those models. To determine the dominant fading model, a statistics-collection function can be used to transform the aforementioned all-tapped delay-model into a histogram-type distribution. From the distribution the dominant tapped delay model for the dominance area under consideration can be decided. That model is suitably the one from the pre-established set that best fits the data. The dominant tap model can optionally further be associated with a theoretical channel model (e.g. pedestrian-A or vehicular-A model).

The SHO branches in the dominance area are determined at step 17 from the estimated path loss. The SHO window size is selected (step 18) for use as a decision threshold to determine the SHO branches. The SHO window size is a dimensioning parameter which can be selected by the network planner. Terming the path loss from a base station $BS_m$ to a location i to be $PL_{i,m}$, the path loss from that base station of the network that provides the best coverage to location i is $PL_{i,1}$. Setting x to be the SHO window size (typically in dB) it can be seen that if $PL_{i,1}-PL_{i,m} \leq x$ then base station m is a base station that will be expected to be participating in soft handoff for location i. By computing this for all base stations nearby i (e.g. all those base stations within the maximum base station signalling range in ideal conditions) the full list of base stations that are in soft hand off for that location i can be estimated. By computing this list for a representative set of locations in the coverage area a base station, the average number of SHO branches in the dominance area of that base station can be calculated as the average of the number of SHO branches at each location in this dominance area.

The MDC gain and fast-fading margin are then determined. (Step 19). As indicated above, this can be conveniently implemented by means of a look-up table, although an algorithm could be used instead. The look-up table could be a performance table such as is commonly used at present in the network planning process. The data in the table can be determined empirically or from link-level or system-level simulations. The table would show the relation between the number of taps and SHO branches, with MDC gain and fast-fading margin (or headroom of power control). Such a table can be developed to include as many cases as necessary. Examples can be found in "Soft Handover Gains in a Fast Power Controlled WCDMA Uplink"; K. Sipilä, Mika Jäsberg, J. Laiho-Steffens and A. Wacker;. IEEE Veh. Technol. Conf., May 1999; see tables 3 to 6. Note that in that document MDC gain is termed "SHO gain" and fading margin is termed "power control headroom".

By using the method described above, in which MDC gain (otherwise known as SHO gain) and fast-fading margin (otherwise known as power control headroom) are determined in a site-specific manner, the network planners can improve the accuracy of planning of link budgets (step 20) and thereby improve capacity, coverage, and performance of planned networks. Site-specific calculations can take different propagation characteristics and environments at each base station into account. The parameter set can be set up more accurately, which then allows the capacity and coverage to be improved over current network planning methods. Using this technique a fully site-specific and automatic network planning (or autoplanning) method can be developed.

For simplicity the preceding description is based on a system in which each base station has a single cell. However, the present invention is equally applicable to systems in which a single base station installation can service multiple cells, for example as sectors radiating from the base station. Such multiple cells could overlap or not. In the terminology of the present application such a base station installation would include multiple base stations each having a respective cell.

The present invention is applicable communication systems that implement macrodiversity, such as 3G/WCDMA/UMTS systems and macrodiversity systems that operate according to derivatives of the 3G/WCDMA/UMTS standards.

The methods described above may be used for planning the deployment of networks that are to be deployed in the future, or for modelling changes to existing networks. Accordingly the said locations of base stations may be planned or proposed locations.

Instead of ray tracing, other simulation methods could be used. Such other methods should be selected as being capable of site-specific propagation/interference estimation.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A method of estimating the operating characteristics of a communication unit in a radio network in which a plurality of such communication units can communicate with a plurality of terminals by means of wireless signals and in which the terminals and the communication units are capable of macro-diversity communication whereby a terminal may simultaneously communicate with a plurality of the communication units, the method comprising:
   estimating for the communication unit and neighbouring communication units the propagation characteristics of the wireless signals to and/or from each such communication unit, in a manner specific to that respective communication unit;
   determining based on at least the estimated propagation characteristics and the relative locations of the communication unit and the neighbouring communication units a representation of at least one of the macro-diversity gain for the communication unit and the fading margin for the communication unit
   wherein determining a representation of at least one of the effective macro-diversity gain for the communication unit and the fading margin for the communication unit includes:
      estimating a dominance area for the communication unit;
      modelling the delay of signals in the dominance area by means of a delay model;
      estimating the extent of macrodiversity in the dominance area;
      determining the said representation based on the said delay model, the estimated extent of macrodiversity and an estimated speed of a terminal relative to the communication units.

2. A method as claimed in claim 1, wherein estimating the propagation characteristics is performed by means of ray tracing.

3. A method as claimed in claim 1, wherein the dominance area is the area in which it is estimated that the communication unit would provide a stronger signal than the other communication units.

4. A method as claimed in claim 1, wherein the delay model is determined by:
   estimating a delay profile for communications from the communication unit to a plurality of locations in the dominance area; and
   selecting the delay model from a plurality of predetermined delay models as being the one of those delay models that best represents the delay profiles to the said locations.

5. A method as claimed in claim 4, wherein the wireless signals have a chip rate and estimating the delay profile comprises:
   determining for each of the said locations a tapped delay model representative of the respective delay profile and the chip rate; and
   selecting the delay model comprises selecting from the predetermined delay models the one of those delay models that best represents the determined tapped delay models.

6. A method as claimed in claim 1, wherein the extent of macrodiversity in the dominance area comprises determining the average number of macrodiversity branches for terminals operating in the dominance area.

7. A method as claimed in 1, comprising determining based on the macro-diversity gain for the communication unit and/or the fading margin for the communication unit a configuration for the network, and operating the network according to that configuration.

8. A method as claimed in claim 7, wherein the said configuration includes one or more of a location for the communication unit and an operational parameter of the communication unit.

9. A method as claimed in claim 8, wherein the operational parameter is a transmission power parameter.

10. A method as claimed in claim 1, wherein the radio network is operable according to a CDMA method.

11. A method as claimed in claim 1, wherein the terminals are radio telephones.

12. A computer program product comprising program code means encoded on a computer usable medium which when loaded into a computer controls the computer to carry out the method of claim 1.

13. A system of estimating the operating characteristics of a communication unit in a radio network in which a plurality of such communication units can communicate with a plurality of terminals by means of wireless signals and in which the terminals and the communication units are capable of macro-diversity communication whereby a terminal may simultaneously communicate with a plurality of the communication units, the method comprising:
   means for estimating for the communication unit and neighbouring communication units the propagation characteristics of the wireless signals to and/or from each such communication unit, in a manner specific to that respective communication unit;
   means for determining based on at least the estimated propagation characteristics and the relative locations of the communication unit and the neighbouring communication units a representation of at least one of the macro-diversity gain for the communication unit and the fading margin for the communication unit;
   wherein the means for determining a representation of at least one of the effective macro-diversity gain for the communication unit and the fading margin for the communication unit includes:
      estimating means for estimating a dominance area for the communication unit;
      means for modelling the delay of signals in the dominance area by means of a delay model;
      means for estimating the extent of macrodiversity in the dominance area;
      means for determining the said representation based on the said delay model, the estimated extent of macrodiversity and an estimated speed of a terminal relative to the communication units.

* * * * *

UNITED STATES PATENT AND TRADEMARK OFFICE
CERTIFICATE OF CORRECTION

| | | |
|---|---|---|
| PATENT NO. | : 7,133,679 B2 | Page 1 of 1 |
| APPLICATION NO. | : 10/694570 | |
| DATED | : November 7, 2006 | |
| INVENTOR(S) | : Zhu | |

It is certified that error appears in the above-identified patent and that said Letters Patent is hereby corrected as shown below:

Column 8, line 5, claim 6, after "wherein" insert -- estimating --.

Column 8, line 53, claim 13, delete "f or" and insert -- for--, therefore.

Signed and Sealed this

Twenty-sixth Day of December, 2006

JON W. DUDAS
*Director of the United States Patent and Trademark Office*